United States Patent
Yu et al.

(10) Patent No.: US 10,955,959 B2
(45) Date of Patent: *Mar. 23, 2021

(54) DEFORMABLE SURFACE INTERACTION METHOD, APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 365 days.

This patent is subject to a terminal disclaimer.

(21) Appl. No.: 15/412,734

(22) Filed: Jan. 23, 2017

(65) Prior Publication Data
US 2017/0228085 A1 Aug. 10, 2017

(30) Foreign Application Priority Data

Feb. 4, 2016 (CN) .......................... 201610080555.0

(51) Int. Cl.
G06F 3/045 (2006.01)
G06F 3/041 (2006.01)
G06F 3/044 (2006.01)

(52) U.S. Cl.
CPC ............ *G06F 3/0416* (2013.01); *G06F 3/044* (2013.01); *G06F 2203/04102* (2013.01)

(58) Field of Classification Search
None
See application file for complete search history.

(56) References Cited

U.S. PATENT DOCUMENTS

2004/0008191 A1* 1/2004 Poupyrev ................ G06F 3/011
345/184
2004/0021694 A1* 2/2004 Doar .................... G06F 3/04855
715/784

(Continued)

FOREIGN PATENT DOCUMENTS

CN 104900152 A 9/2015
CN 105259984 A 1/2016

(Continued)

*Primary Examiner* — Kirk W Hermann
(74) *Attorney, Agent, or Firm* — Sheppard Mullin Richter & Hampton LLP

(57) ABSTRACT

Embodiments of the present application disclose an interaction method, an interaction apparatus, and user equipment. The method comprises: determining shape related information of a deformable touch sensing surface, where the shape related information corresponds to a first shape of the deformable touch sensing surface after a folding deformation; determining multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and using the multiple effective interaction areas as an interaction area at least according to a first relative position of the multiple effective interaction areas in the spatial position in the first shape to provide a touch sensing interface to at least one interaction object.

25 Claims, 17 Drawing Sheets

(56) References Cited

U.S. PATENT DOCUMENTS

| | | | |
|---|---|---|---|
| 2010/0011291 A1* | 1/2010 | Nurmi | G06F 3/0414 |
| | | | 715/702 |
| 2010/0045705 A1* | 2/2010 | Vertegaal | A47G 19/2227 |
| | | | 345/661 |
| 2010/0064244 A1* | 3/2010 | Kilpatrick, II | G06F 1/1616 |
| | | | 715/773 |
| 2011/0209089 A1* | 8/2011 | Hinckley | G06F 1/1647 |
| | | | 715/810 |
| 2012/0038570 A1* | 2/2012 | Delaporte | G06F 1/1616 |
| | | | 345/173 |
| 2012/0266098 A1* | 10/2012 | Webber | G06Q 10/107 |
| | | | 715/778 |
| 2012/0306910 A1 | 12/2012 | Kim et al. | |
| 2013/0010205 A1* | 1/2013 | Kobayashi | G09F 9/33 |
| | | | 348/725 |
| 2014/0029017 A1* | 1/2014 | Lee | G01B 11/24 |
| | | | 356/601 |
| 2014/0058725 A1* | 2/2014 | Longe | G06F 40/232 |
| | | | 704/9 |
| 2014/0078047 A1* | 3/2014 | Seo | G06F 3/0487 |
| | | | 345/156 |
| 2014/0380186 A1* | 12/2014 | Kim | G06F 1/1624 |
| | | | 715/746 |
| 2015/0220119 A1* | 8/2015 | Seo | G06F 3/041 |
| | | | 345/173 |
| 2015/0225023 A1 | 9/2015 | Lee et al. | |
| 2015/0255023 A1 | 9/2015 | Lee et al. | |
| 2015/0301636 A1* | 10/2015 | Akimoto | H01L 29/78696 |
| | | | 345/173 |
| 2016/0187994 A1* | 6/2016 | La | G06F 1/1652 |
| | | | 345/619 |
| 2016/0246559 A1* | 8/2016 | Jung | G06F 3/1431 |
| 2016/0299539 A1* | 10/2016 | Jang | G06F 1/1681 |
| 2018/0039471 A1* | 2/2018 | Yanagisawa | G06F 3/14 |

FOREIGN PATENT DOCUMENTS

| | | | |
|---|---|---|---|
| JP | 2008304592 A | * | 12/2008 |
| KR | 20100081161 A | * | 7/2010 |

\* cited by examiner

DEFORMABLE SURFACE INTERACTION METHOD, APPARATUS, AND USER EQUIPMENT

CROSS REFERENCE TO RELATED APPLICATION

The present application is based on and claims the benefit of priority to Chinese Application No. 201610080555.0, filed on Feb. 4, 2016, the entire contents of which are incorporated herein by reference.

TECHNICAL FIELD

The present application relates to the field of interaction technologies, and in particular, to an interaction method, an interaction apparatus, and user equipment.

BACKGROUND

With the development of technologies, deformable devices such as flexible devices become increasingly popular. Deformable devices have changeable shapes, and therefore bring users a lot of new user experience. For example, demands of users for wearable devices to meet different body curves, demands for devices to have increased sizes for using and decreased sizes for carrying, and the like are met more easily. When deformable interaction devices are used to perform interaction, different experience is also brought to users.

SUMMARY

A possible objective of embodiments of the present application is to provide an interaction solution based on a deformable touch sensing surface.

According to a first aspect, a possible implementation solution of the present application provides an interaction method, comprising:

determining shape related information of a deformable touch sensing surface, where the shape related information corresponds to a first shape of the deformable touch sensing surface after a folding deformation;

determining multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and using the multiple effective interaction areas as an interaction area at least according to a first relative position of the multiple effective interaction areas in the spatial position in the first shape to provide a touch sensing interface to at least one interaction object.

According to a second aspect, a possible implementation solution of the present application provides an interaction apparatus, comprising:

an information determining module, configured to determine shape related information of a deformable touch sensing surface, where the shape related information corresponds to a first shape of the deformable touch sensing surface after a folding deformation;

an area determining module, configured to determine multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and a touch sensing interface providing module, configured to use the multiple effective interaction areas as an interaction area at least according to a first relative position of the multiple effective interaction areas in the spatial position in the first shape to provide a touch sensing interface to at least one interaction object.

According to a third aspect, a possible implementation solution of the present application provides user equipment, where the user equipment comprises:

a memory, configured to store a program; and a processor, configured to execute the program stored in the memory, the program causes the processor to execute the following operations:

determining shape related information of a deformable touch sensing surface, where the shape related information corresponds to a first shape of the deformable touch sensing surface after a folding deformation;

determining multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and using the multiple effective interaction areas as an interaction area at least according to a first relative position of the multiple effective interaction areas in the spatial position in the first shape to provide a touch sensing interface to at least one interaction object.

In at least one implementation solution of the embodiments of the present application, after a deformation of a deformable touch sensing surface occurs, multiple effective interaction areas adjacent in a spatial position are recombined to form a new interaction area used to provide a touch sensing interface to an interaction object, thereby bringing new experience to a user by using a deformation property of a deformable device.

DETAILED DESCRIPTION

Figure 1:
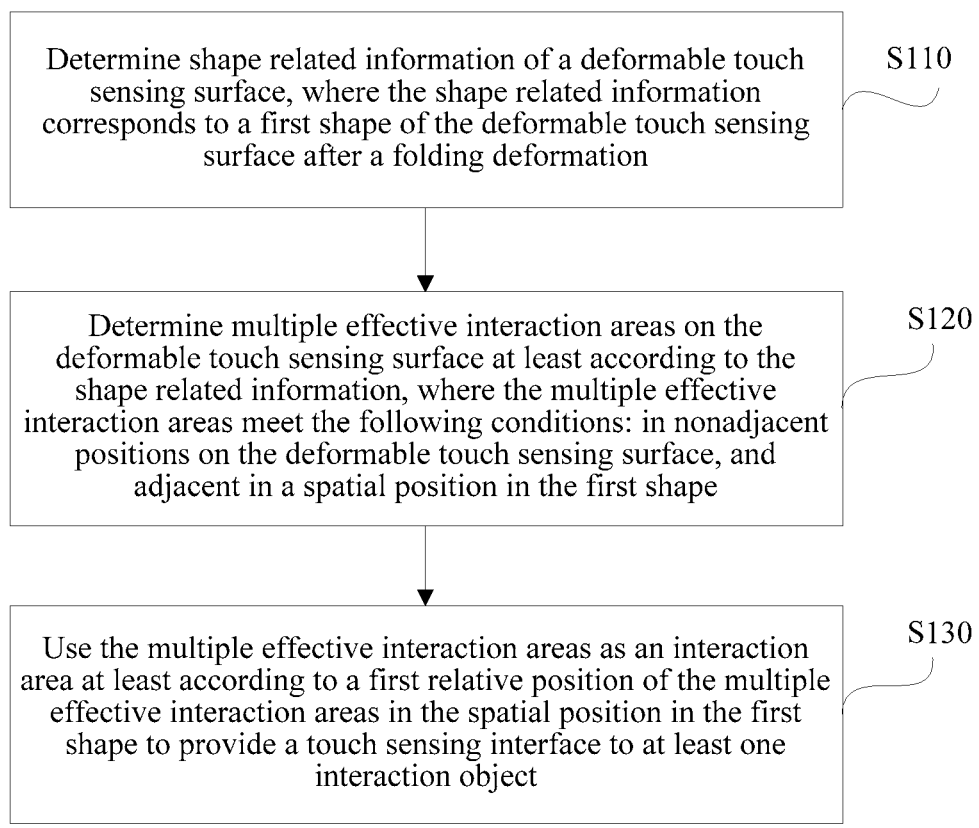
FIG. 1 is a schematic flowchart of an interaction method according to an embodiment of the present application.

The specific implementing manners of the present application are further described below in detail with reference to the accompanying drawings (a same reference numeral in several drawings represents a same element) and embodiments. The embodiments below are used for describing the present application rather than to limit the scope of the present application.

A person skilled in the art may understand that, terms such as "first" and "second" in the present application are only used to distinguish different steps, devices or modules and the like, but do not represent any specific technical meanings, and do not denote a necessary logic order among the steps, devices or modules and the like.

The inventor of the present application finds that, because a deformable touch sensing surface has a changeable shape, after a deformation occurs, for some effective interaction areas before the deformation, for example, areas that are covered or blocked after the deformation occurs, effective interaction may no longer be able to be performed after the deformation occurs. Meanwhile, some multiple interaction areas that are originally scattered may become multiple effective interaction areas adjacent in a spatial position after the deformation occurs, and effective use of the multiple effective interaction areas may cause a deformable device to bring more desirable user experience to a user.

In the following description of the present application:

An interaction object of the deformable touch sensing surface may be a user, or may be an electronic device and the like.

An effective interaction area is an area where effective interaction may be performed with an interaction object. In a possible implementing manner, the effective interaction area may be an area with which an interaction object may perform interaction. For example, the effective interaction area is an area that may be conveniently touched by the interaction object. In some possible implementing manners, for example, it may be set that there is no obstacle within a set distance range on a side faced by the effective interaction area; and/or it is set that the effective interaction area faces a side where the interaction object is located; and so on. Alternatively, further, in another possible implementing manner, in addition to that an interaction object may perform interaction, it is further required that the interaction meets a set interaction condition, to cause interaction between the effective interaction area and the interaction object to achieve an expected interaction effect. For example, the interaction condition may comprise that: interaction information acquired by using the effective interaction area is consistent with interaction information that is intended to be input by using an interaction object.

A position of an area on the deformable touch sensing surface is: a position of a coordinate area corresponding to the area on a coordinate surface, where the deformable touch sensing surface is used as the coordinate surface. Regardless of how the deformable touch sensing surface is bent or folded, a coordinate area corresponding to the area does not change.

A spatial position of an area is a position of the area in a spatial coordinate system.

As shown in FIG. 1, an embodiment of the present application provides an interaction method, comprising:

S110: Determine shape related information of a deformable touch sensing surface, where the shape related information corresponds to a first shape of the deformable touch sensing surface after a folding deformation.

S120: Determine multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape.

S130: Use the multiple effective interaction areas as an interaction area at least according to a first relative position of the multiple effective interaction areas in the spatial position in the first shape to provide a touch sensing interface to at least one interaction object.

For example, the interaction apparatus provided in the present application is used as an execution subject in this embodiment to execute S110 to S130. Specifically, the interaction apparatus may be disposed in user equipment in a manner of software, hardware or a combination of software and hardware, or, the interaction apparatus may be the user equipment. The user equipment comprises but not limited to a mobile phone, a computer, a television, a wearable device or the like that has a deformable touch sensing surface that allows a folding deformation.

In an implementing manner in this embodiment of the present application, after a deformation of a deformable touch sensing surface occurs, multiple effective interaction areas adjacent in the spatial position are recombined to obtain one new interaction area used to provide a touch sensing interface to an interaction object, thereby bringing new experience to a user by using a deformation property of a deformable device.

The method in this embodiment of the present application is further described by using the following implementing manners.

Figure 2A:
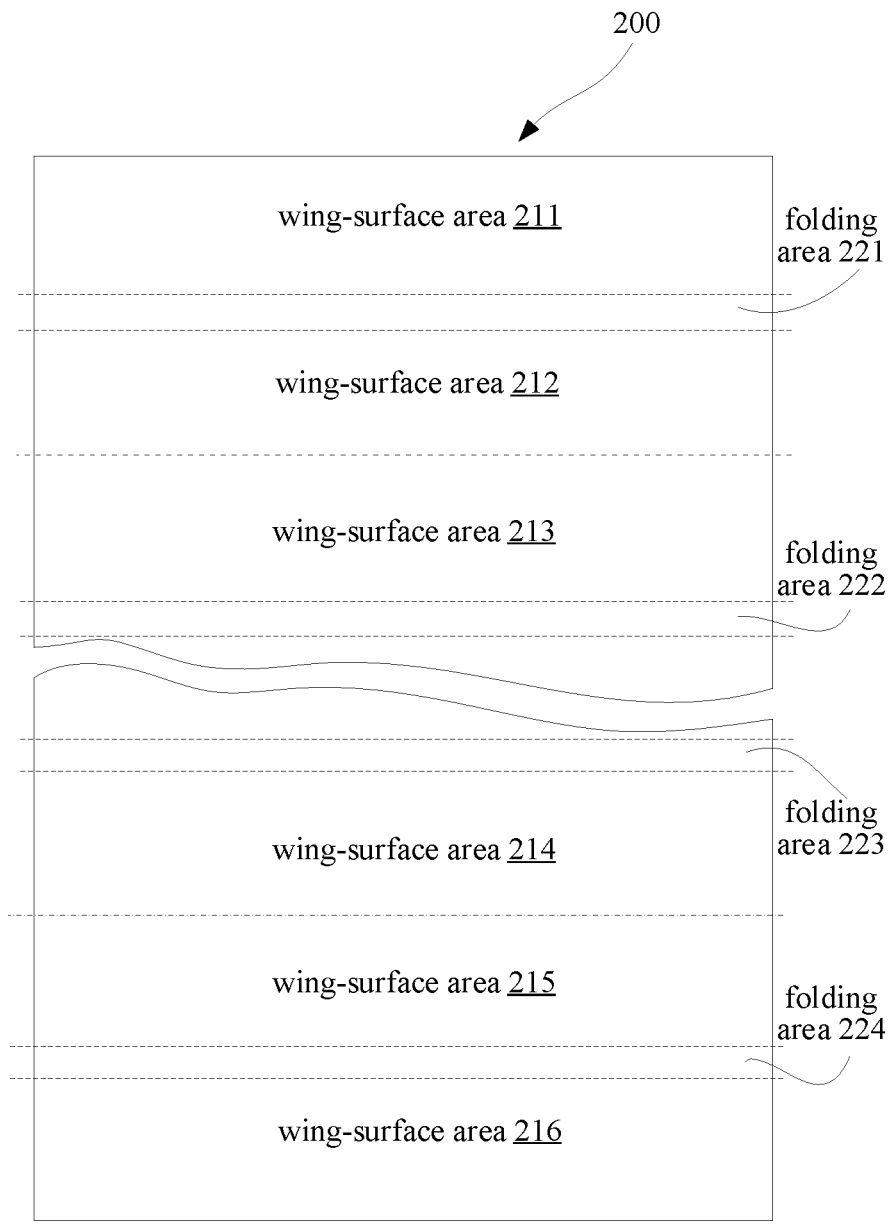
FIG. 2a to FIG. 2e are schematic diagrams of an application scenario of an interaction method according to an embodiment of the present application.
Figure 2B:
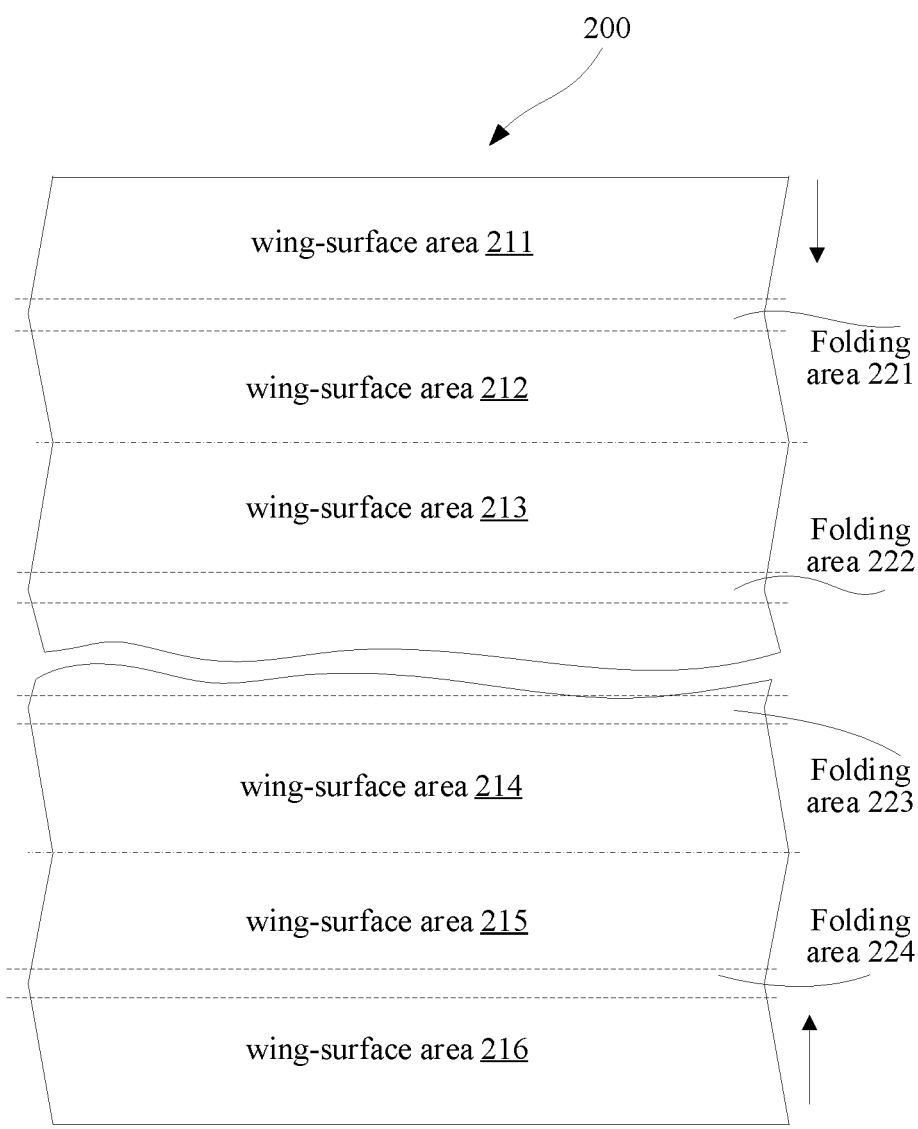

In a possible implementing manner, a shape of a deformable touch sensing surface 200 being unfolded is a rectangle shown in FIG. 2a. During a folding deformation, the rectangle shown in FIG. 2a turns into a wavy state shown in FIG. 2b and eventually becomes a folded state shown in FIG. 2c. FIG. 2d is a right diagram of FIG. 2c.

As can be seen from FIG. 2a to FIG. 2d, after a folding deformation of the deformable touch sensing surface 200 occurs, a part of the interaction area (for example, wing-surface areas 212 to 215) is folded and blocked and is no longer an effective interaction area. In some possible implementing manners, another part of interaction area (for example, wing-surface areas 211 and 216) may also be no longer an effective interaction area because of a facing-direction problem (for example, an interaction direction D of an interaction object to the deformable touch sensing surface 200 is a direction right opposite the deformable touch sensing surface 200 shown in FIG. 2a to FIG. 2c).

In the implementing manner shown in FIG. 2a to FIG. 2d, only several remaining folding areas 221 to 225 where several outwardly-bending end surfaces are located are effective interaction areas that still can be used to perform effective interaction with an interaction object.

In this embodiment of the present application, a folding area is an area corresponding to a bending end that connects two opposite wing surfaces in a creased structure. For example, a folding area 221 is an area corresponding to a bending end that connects two opposite wing surface areas 211 and 212 after folding.

Conventionally, after the foregoing folding deformation is performed on the deformable touch sensing surface 200, for remaining effective interaction areas, a possible manner is: an interaction function of the entire deformable touch sensing surface 200 is turned off, and interaction is no longer performed with the interaction object. Another possible manner is: The remaining effective interaction areas are still used as a part of the touch sensing interface before the deformation to perform incomplete interaction with the interaction object.

The inventor of the present application finds that, in some scenarios, after the folding deformation of the deformable touch sensing surface occurs, multiple effective interaction areas adjacent in a spatial position may be formed. Although an area of one effective interaction area may be relatively small and can hardly be used as a separate touch sensing interface to perform interaction with an interaction object, the multiple effective interaction areas may be recombined into one relatively large interaction area and may be reused.

In this embodiment of the present application, shape related information corresponding to the first shape of the deformable touch sensing surface after a folding deformation is determined, and the multiple effective interaction areas are then determined according to the shape related information.

In a possible implementing manner, optionally, the shape related information may comprise:

the first shape information of the first shape.

Figure 2C:
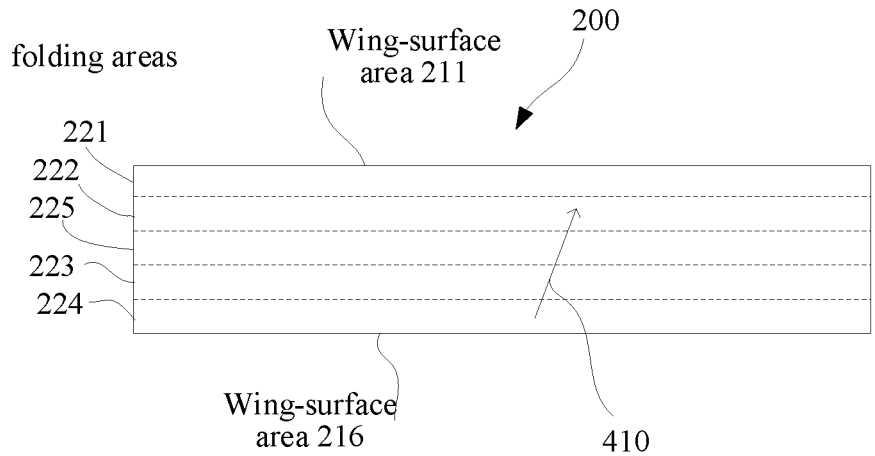
Figure 2D:
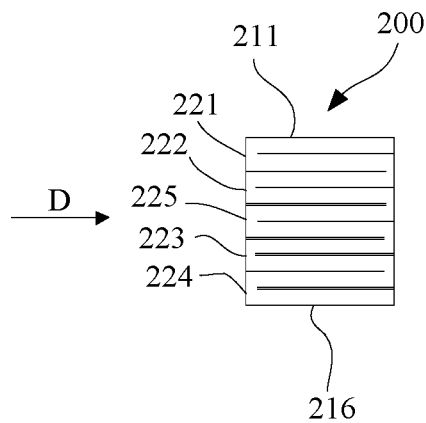

For example, in the implementing manner shown in FIG. 2a to FIG. 2d, shape information of the deformable touch sensing surface after the folding shown in FIG. 2c and FIG. 2d may be acquired as the shape related information.

In another possible implementing manner, optionally, the shape related information may also be not the first shape information, and instead may indirectly obtain other information of the first shape information. For example, the shape related information comprises:

second shape information of a second shape of the deformable touch sensing surface before the folding deformation, and deformation information corresponding to the folding deformation.

Here, the deformation information may be a shape change parameter, or may be another parameter related to a deformation. For example, when the deformable touch sensing surface is a thermally-induced deformation material, the deformation information may comprise temperature change information and the like of areas. Alternatively, for example, the deformation information may further be displacement information, of areas on the deformable touch sensing surface, acquired by using an acceleration sensing array, a gyroscope array, and the like corresponding to the deformable touch sensing surface.

A person skilled in the art may know that the first shape may also be determined according to the second shape information and the deformation information.

In a possible implementing manner, the deformable touch sensing surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in S110, the shape related information may be determined at least according to a deformation control instruction, where the deformation control instruction is used to control the folding deformation of the deformable touch sensing surface.

For example, in the implementing manner as shown in FIG. 2a to FIG. 2d, a first deformation control instruction may be obtained in response to an operation that a user clicks a "Fold" button. The first deformation control instruction corresponds to the shape shown in FIG. 2c. In this case, regardless of a shape of the deformable touch sensing surface before a folding deformation, once the first deformation control instruction is acquired, the deformable touch sensing surface is automatically controlled to deform into the shape shown in FIG. 2c.

In other possible implementing manners, for example, when the deformation control instruction corresponds to deformation information, in S110, the second shape information further requires to be acquired to obtain the shape related information.

In addition to the foregoing the deformation control instruction, a deformation sensor configured to acquire corresponding deformation sensing information according to a deformation of the deformable touch sensing surface may be further used to obtain the deformation related information. The deformation sensor, for example, may generate a corresponding voltage or current parameter value according to a deformation of the deformable touch sensing surface, where the deformation sensing information is the voltage or current parameter value.

In a possible implementing manner, after the folding deformation of the deformable touch sensing surface occurs, the shape related information may be determined at least according to the deformation sensing information.

In the method in this embodiment of the present application, after the shape related information is acquired, the multiple effective interaction areas may be determined at least according to the shape related information.

In this embodiment of the present application, the multiple effective interaction areas meet the following conditions: in nonadjacent positions on the deformable touch sensing surface, and adjacent in a spatial position in the first shape.

Here, the multiple effective interaction areas are adjacent in a spatial position in the first shape, and therefore can be recombined into one interaction area.

In this embodiment of the present application, if two effective interaction areas are in adjacent positions on the deformable touch sensing surface and are adjacent in the spatial position in the first shape, the two effective interaction areas may be seen as one effective interaction area.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0. For example, in the implementing manner shown in FIG. 2c and FIG. 2d, two adjacent effective interaction areas adjoin.

Figure 2E:
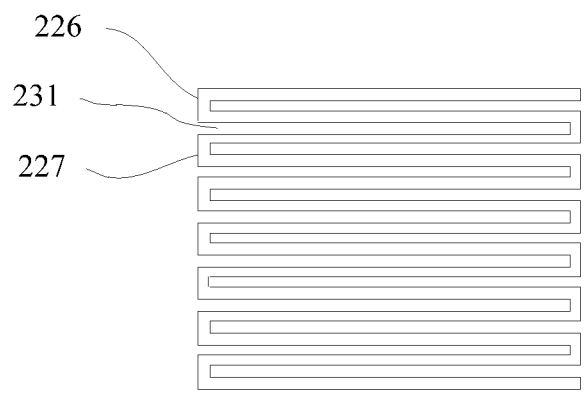

Alternatively, in another possible implementing manner, that two effective interaction areas are adjacent in a spatial position may be that a distance between nearby edges of the two interaction areas is less than a set value. For example, the deformable touch sensing surface shown in FIG. 2a may also be folded and deformed into the shape shown in FIG. 2e. A gap area 231 further exists between the two adjacent effective interaction areas 226, 227. In this implementing manner, when a width (a width in a vertical direction in FIG. 2e) of the gap area 231 is less than set value, it may be considered that the two effective interaction areas 226, 227 are adjacent.

In some possible implementing manners, the set value may be determined according to influence of the distance on interaction of the interaction object. For example, when the distance between two adjacent effective interaction areas is too large for a user to perform touch input between the two effective interaction areas (for example, a slide gesture cannot successfully traverse two effective interaction areas), the distance between the two effective interaction areas is greater than the set value.

In a possible implementing manner, S120 may comprise:
determining, according to the shape related information, multiple folding areas where multiple outwardly-bending end surfaces are located, where the multiple outwardly-bending end surfaces are adjacent in the spatial position on the deformable touch sensing surface in the first shape; and
determining the multiple effective interaction areas at least according to the multiple folding areas.

In a possible implementing manner, the multiple effective interaction areas are the multiple folding areas.

As shown in FIG. 2a and FIG. 2c, positions of each two of the multiple folding areas 221 to 225 on the deformable touch sensing surface are separated by at least another interaction area and are not adjacent to each other. In a deformed spatial position, the multiple folding areas 221 to 225 are adjacent. Therefore, in the implementing manner shown in FIG. 2a to FIG. 2d, it may be determined that the multiple folding areas 221 to 225 are the multiple effective interaction areas.

In some possible implementing manners, in addition to the foregoing the multiple folding areas, the multiple effective interaction areas may further comprise another area that is adjacent to or is connected to the multiple folding areas in the spatial position after the folding deformation occurs.

For example, in a possible implementing manner, as shown in FIG. 2a to FIG. 2d, the folding area 221 and the wing-surface area 211 that are connected may be used as one effective interaction area; and the folding area 224 and the wing-surface area 216 that are connected may be used as one effective interaction area.

Figure 3A:
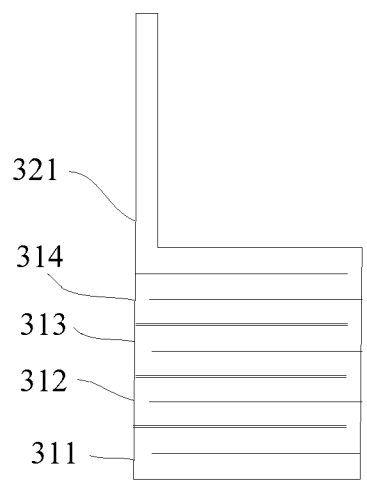
FIG. 3a and FIG. 3b are schematic diagrams of two shapes after a deformable touch sensing surface is folded in an interaction method according to an embodiment of the present application.

Further, for example, in the implementing manner shown in FIG. 3a, in a case in which an interaction direction is considered, in addition to four folding areas 311 to 314, an unfolded area 321 (an area where a wing surface is located in a creased structure) is also an effective interaction area facing the interaction object, and is adjacent to the four folding areas 311 to 314 in the spatial position. Therefore, the multiple effective interaction areas further comprise the unfolded area 321.

Therefore, the determining the multiple effective interaction areas at least according to the multiple folding areas comprises:
determining the multiple effective interaction areas at least according to the multiple folding areas and the first shape.

Certainly, in addition to the foregoing several factors that need to be considered, in some other possible implementing manners, during the determining the multiple effective interaction areas at least according to the multiple folding areas, another factor may further need to be considered.

Figure 3B:
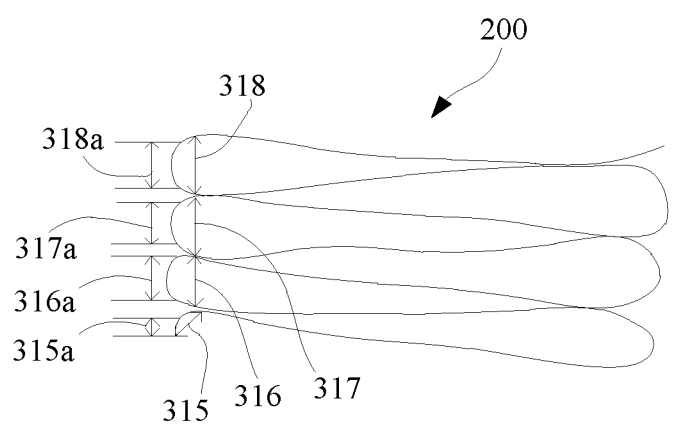

For example, in a possible implementing manner, a characteristic of interaction further needs to be considered to determine whether the multiple folding areas are all effective interaction areas. For example, in a possible implementing manner, a first shape of the deformable touch sensing surface 200 shown in FIG. 2a after a folding deformation may also be shown in FIG. 3b, and four folding areas 315 to 318 may be determined according to the first shape. However, in a process of interaction with an interaction object, the four folding areas 315 to 318 are not necessarily all effective interaction areas. For example, parts close to each other of two adjacent folding areas may be beyond the reach of an interaction object, and therefore, only a part of each folding area is an effective interaction area. For example, as shown in FIG. 3b, according to the four folding areas 315 to 318 and a characteristic (for example, usually a characteristic such as a shape of a finger of a user) of an interaction object, four effective interaction areas 315a to 318a may be determined.

In this embodiment of the present application, after the multiple effective interaction areas are determined, the multiple effective interaction areas may be used as one new interaction area to provide a touch sensing interface to an interaction object.

In a possible implementing manner, the using the multiple effective interaction areas as one interaction area at least according to a first relative position may be: splicing the multiple effective interaction areas to the interaction area according to the first relative position.

In a possible implementing manner, the deformable touch sensing surface implements interaction with an interaction object by using an interaction unit array that comprises multiple interaction units, and each effective interaction area corresponds to multiple interaction units. In this implementing manner, an interaction unit may be a touch sensing unit.

In a possible implementing manner, the splicing may be performing readdressing on addresses of interaction units in the multiple effective interaction areas, to obtain a new address that matches the interaction area.

For example, it is assumed that in the implementing manner shown in FIG. 2a, before the folding deformation, first addresses (x,y) of interaction units comprised in the folding area 221 and the folding area 222 (where x is a first row address, y is a first column address, and in a possible implementing manner, the first address may also be used as coordinates of a position of an interaction unit on the deformable touch sensing surface) are shown in Table 1 and Table 2:

TABLE 1

First addresses of 30 interaction units
comprised in the folding area 221

| | | | | | | | | | |
|---|---|---|---|---|---|---|---|---|---|
| 13, 1 | 13, 2 | 13, 3 | 13, 4 | 13, 5 | 13, 6 | 13, 7 | 13, 8 | 13, 9 | 13, 10 |
| 14, 1 | 14, 2 | 14, 3 | 14, 4 | 14, 5 | 14, 6 | 14, 7 | 14, 8 | 14, 9 | 14, 10 |
| 15, 1 | 15, 2 | 15, 3 | 15, 4 | 15, 5 | 15, 6 | 15, 7 | 15, 8 | 15, 9 | 15, 10 |

TABLE 2

First addresses of 30 interaction units
comprised in the folding area 222

| | | | | | | | | | |
|---|---|---|---|---|---|---|---|---|---|
| 40, 1 | 40, 2 | 40, 3 | 40, 4 | 40, 5 | 40, 6 | 40, 7 | 40, 8 | 40, 9 | 40, 10 |
| 41, 1 | 41, 2 | 41, 3 | 41, 4 | 41, 5 | 41, 6 | 41, 7 | 41, 8 | 41, 9 | 41, 10 |
| 42, 1 | 42, 2 | 42, 3 | 42, 4 | 42, 5 | 42, 6 | 42, 7 | 42, 8 | 42, 9 | 42, 10 |

In this implementing manner, if readdressing is performed on addresses of the interaction units in the two folding areas 221, 222 according to relative positions in space of the two folding areas 221, 222 in the first shape after the folding deformation shown in FIG. 2c, second addresses (x1,y1) of the interaction units as shown in Table 3 and Table 4 may be obtained:

TABLE 3

Second addresses of the 30 interaction
units comprised in the folding area 221

| | | | | | | | | | |
|---|---|---|---|---|---|---|---|---|---|
| 1, 1 | 1, 2 | 1, 3 | 1, 4 | 1, 5 | 1, 6 | 1, 7 | 1, 8 | 1, 9 | 1, 10 |
| 2, 1 | 2, 2 | 2, 3 | 2, 4 | 2, 5 | 2, 6 | 2, 7 | 2, 8 | 2, 9 | 2, 10 |
| 3, 1 | 3, 2 | 3, 3 | 3, 4 | 3, 5 | 3, 6 | 3, 7 | 3, 8 | 3, 9 | 3, 10 |

TABLE 4

Second addresses of the 30 interaction
units comprised in the folding area 222

| | | | | | | | | | |
|---|---|---|---|---|---|---|---|---|---|
| 4, 1 | 4, 2 | 4, 3 | 4, 4 | 4, 5 | 4, 6 | 4, 7 | 4, 8 | 4, 9 | 4, 10 |
| 5, 1 | 5, 2 | 5, 3 | 5, 4 | 5, 5 | 5, 6 | 5, 7 | 5, 8 | 5, 9 | 5, 10 |
| 6, 1 | 6, 2 | 6, 3 | 6, 4 | 6, 5 | 6, 6 | 6, 7 | 6, 8 | 6, 9 | 6, 10 |

It may be seen that, after readdressing is performed on the addresses of the interaction units in the two folding areas 221, 222, second addresses of multiple interaction units respectively comprised in the two adjacent folding areas 221, 222 after the folding deformation are also adjacent and consecutive.

In another possible implementing manner, in the splicing, readdressing may also be not performed on the addresses of the interaction units in the multiple effective interaction areas, that is, the addresses of the interaction units are kept unchanged, but correlations between the addresses are changed.

For example, in a scenario in which the interaction units are scanned during interaction with an interaction object, the first address (15,10) of the last interaction unit of the folding area 221 and the first address (40,1) of the first interaction unit of the folding area 222 are correlated, to cause that during interaction of interaction information with an interaction object, after the last interaction unit of the folding area 221 is scanned, the first interaction unit of the folding area 222 is scanned next, and another area between the two folding areas 221, 222 is no longer scanned.

In still another possible implementing manner, the splicing may also be virtual splicing, and the interaction area is a virtual interaction area, that is, according to the first relative position, the multiple effective interaction areas are virtually spliced and mapped onto the virtual interaction area.

In a possible implementing manner, optionally, S130 may further comprise:

determining touch sensing information corresponding to the interaction area.

In the foregoing scenario in which readdressing is performed and correlations between addresses are changed to obtain the interaction area, if the interaction apparatus comprises the deformable touch sensing surface, the determining touch sensing information corresponding to the interaction area may comprise: performing overall touch sensing scanning on all touch sensing units comprised in the interaction area, to obtain the touch sensing information.

In another possible implementing manner, the determining touch sensing information corresponding to the interaction area may further comprise:

determining multiple pieces of touch sensing sub-information corresponding to the multiple effective interaction areas, for example, performing touch sensing scanning on the multiple effective interaction areas respectively, to obtain the multiple pieces of touch sensing sub-information; and mapping the touch sensing sub-information from the multiple effective interaction areas to the interaction area according to the first relative position, to obtain the touch sensing information corresponding to the interaction area.

In another possible implementing manner, when the interaction apparatus does not comprise the deformable touch sensing surface, the determining touch sensing information may further be acquiring the touch sensing information from at least one external device by using a manner of communication.

For example, the user makes a slide gesture in the multiple effective interaction areas 221 to 225 shown in FIG. 2c, and a slide trajectory 410 corresponding to the gesture passes through four effective interaction areas 222 to 225.

Figure 4A:
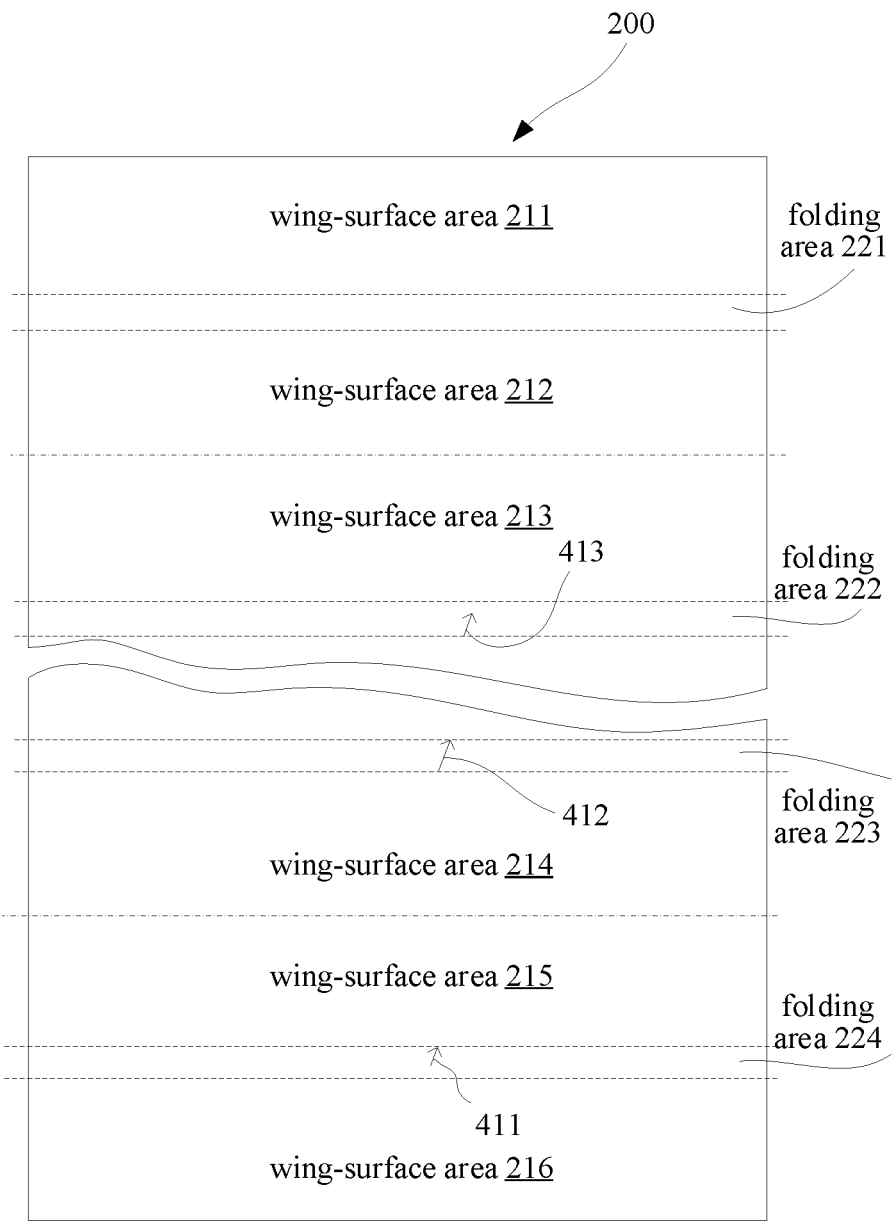
FIG. 4a and FIG. 4b are schematic diagrams of mapping multiple pieces of touch sensing sub-information from multiple effective interaction areas to interaction areas corresponding to the multiple effective interaction areas in an interaction method according to an embodiment of the present application.

For the deformable touch sensing surface 200, as shown in FIG. 4a, four pieces of touch sensing sub-information corresponding to four slide trajectories 411 to 413 that are discretely distributed on the deformable touch sensing surface 200 and are continuous in time (a slide trajectory corresponding to the effective interaction area 225 is not shown in FIG. 4a) may be determined by using a touch sensing array corresponding to the deformable touch sensing surface 200.

Figure 4B:
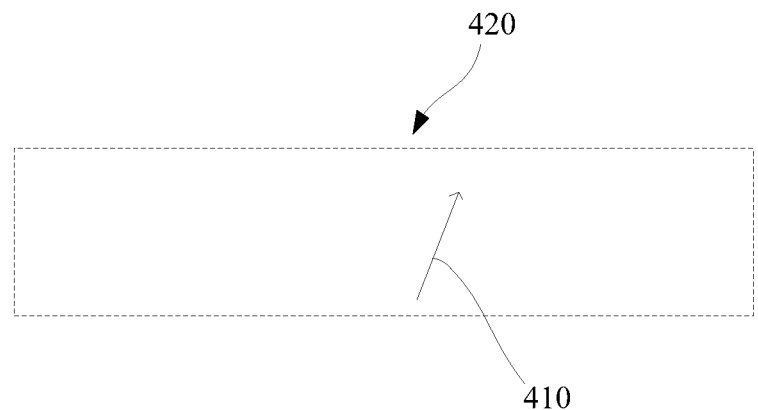

Touch sensing information corresponding to the slide trajectory 410 may be obtained by mapping the four pieces of touch sensing sub-information from the multiple effective interaction areas 221 to 225 to an interaction area 420 corresponding to the multiple effective interaction areas 221 to 225, as shown in FIG. 4b.

In a possible implementing manner, optionally, S130 may further comprise: determining input content corresponding to the touch sensing information at least according to the touch sensing information.

For example, in the implementing manner shown in FIG. 4a and FIG. 4b, the input content, for example, may be an input instruction corresponding to the touch sensing information.

In some possible implementing manners, the touch sensing information may comprise distance information. For example, in the implementing manner shown in FIG. 4a and FIG. 4b, the touch sensing information comprises distance information from a starting point of the slide trajectory 410. Here, because the slide trajectory 410 is a straight line trajectory, a distance corresponding to the distance information is a length of the slide trajectory 410.

In some possible implementing manners, the distance information is related to the input content. For example, a gesture corresponding to the slide trajectory 410 is used to adjust display brightness of a display screen. When the length of the slide trajectory is greater than a set value, the display brightness is adjusted by 20%. In some possible implementing manners, after a folding deformation of the deformable touch sensing surface occurs, under the limit that the size of the interaction area is reduced, a user cannot conveniently implement a gesture corresponding to input content in the interaction area. Therefore, in this implementing manner, the determining input content at least according to the touch sensing information comprises:

determining reference touch sensing information corresponding to the touch sensing information at least according to a scaling ratio of the interaction area relative to the deformable touch sensing surface, where the reference touch sensing information comprises reference distance information between which and the distance information the scaling ratio is met; and determining the input content according to the reference touch sensing information and a correspondence between at least one piece of reference touch sensing information and at least one piece of input content.

In this implementing manner, a second correspondence between at least one piece of reference touch sensing information and at least one piece of input content may be a correspondence between at least one piece of touch sensing information and at least one piece of input content corresponding to an unfolded state of the deformable touch sensing surface.

In a possible implementing manner, the scaling ratio may be a ratio of an area of the interaction area to an area of the deformable touch sensing surface. In another possible implementing manner, if distance information has a directional limit, the scaling ratio is also related to a direction. For example, the distance information comprises: a distance in a length direction and/or a distance in a width direction, and the like, and the scaling ratio may further be a ratio of a length of the interaction area to a length of the deformable touch sensing surface, and/or a ratio of a width of the interaction area to a width of the deformable touch sensing surface, and the like.

For example, in the implementing manner shown in FIG. 4a and FIG. 4b, a scaling ratio of the interaction area 420 to the deformable touch sensing surface 200 is, for example, 1:10 in the length direction and 1:1 in the width direction. From a starting point of the slide trajectory 410, a distance in the length direction is dy, and a distance in the width direction is dx.

It is determined that a distance in a length direction of a first reference slide trajectory corresponding to the slide trajectory 410 is 10*dy, and a distance in a width direction of the first reference slide trajectory is dx.

The following correspondence exists between a reference slide trajectory and input content:

when a distance in the length direction of the reference slide trajectory is greater than a set distance threshold Dsy, brightness of the display screen is turned up by 20%.

$$10*dy > Dsy > dy.$$

It may be determined according to the correspondence and the distance in the length direction of the reference slide trajectory that input content corresponding to the slide trajectory 410 is: the brightness of the display screen is turned up by 20%.

By using this implementing manner, a problem that an original gesture input cannot or can hardly be accomplished because a size of an interaction area changes can be avoided.

By using the foregoing implementing manner, an interaction effect of interaction between an interaction object and the interaction apparatus by using the multiple effective interaction areas may be the same as or similar to an interaction effect of interaction with the interaction apparatus by using the interaction area.

A flexible sensing-type capacitive screen is used as an example below to further describe this embodiment of the present application.

Figure 5A:
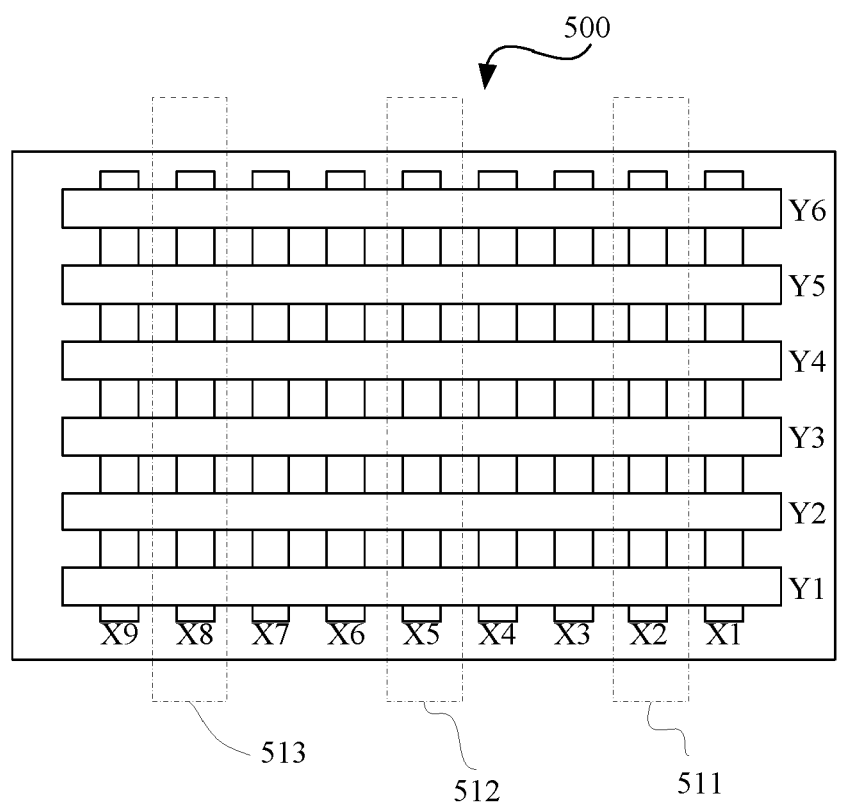
FIG. 5a to FIG. 5c are schematic diagrams of an application scenario of an interaction method according to an embodiment of the present application.

FIG. 5a shows the distribution of six top-layer Y-axis electrodes Y1 to Y6 and nine bottom-layer X-axis electrodes X1 to X9 of the flexible sensing-type capacitive screen 500.

Figure 5B:
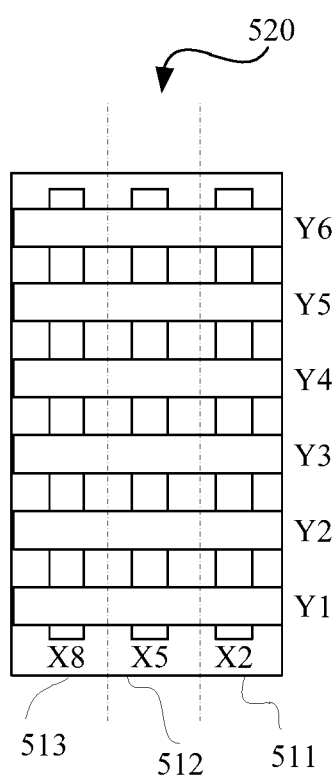

After a folding deformation, areas corresponding to four X-axis electrodes X3, X4, X6, and X7 are covered, two X-axis electrodes X1 and X9 are folded onto a lateral surface perpendicular to a paper plane, and it is inconvenient for a user to perform input interaction in a direction towards the paper plane. Therefore, all these six X-axis electrodes are no longer effective interaction areas. In this implementing manner, when a user input is detected, these six X-axis electrodes may not need to be driven (while the six Y-axis electrodes still need to be driven), so that self-interference is avoided and power consumption can be lowered. In addition, areas where three X-axis electrodes X2, X5, and X8 are located are three folding areas 511 to 513 of a shape after the folding deformation, so as to form three effective interaction areas after the folding deformation. Positions and a distribution of electrodes of the three effective interaction areas after the folding deformation are shown in FIG. 5b. It may be seen that positions of the three effective interaction areas on the flexible sensing-type capacitive screen 500 are not adjacent, and are adjacent in a spatial position after a current time of folding deformation.

The three X-axis electrodes X2, X5, and X8 are correlated as adjacent electrodes to splice the three effective interaction areas to obtain an interaction area 520 after the folding deformation, and a user may perform touch input with the interaction area 520.

Figure 5C:
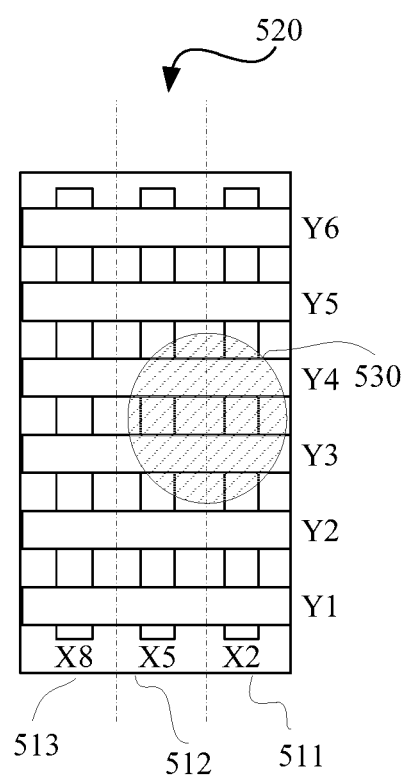

As shown in FIG. 5c, on the interaction area 520, an input contact 530 of a user is detected as changes in sensing capacitance corresponding to four electrode nodes: (X2, Y3), (X2, Y4), (X5, Y3), and (X5, Y4), and because of an approximation relationship of the four electrode nodes, an input of the user is determined as a single-point input whose area is A (which comprises the foregoing four electrode nodes). A person skilled in the art may know that if the three X-axis electrodes X8, X5, and X2 are not correlated as adjacent electrodes, the system determines the input as two multi-point inputs each having an area of B (a first point comprising two electrode nodes (X2,Y3) and (X2,Y4) and a second point comprising two electrode nodes (X5,Y3) and (X5,Y4)), to cause that the user cannot perform a correct input operation by using the flexible sensing-type capacitive screen 500 after a folding deformation.

A person skilled in the art may understand that, in the foregoing method of specific implementing manners of the present application, sequence numbers of steps do not mean an order of executing the steps, where the order of executing the steps should be determined by the functions and internal logic of the steps, and should not constitute any limitation on implementation processes of the specific implementing manners of the present application.

Figure 6:
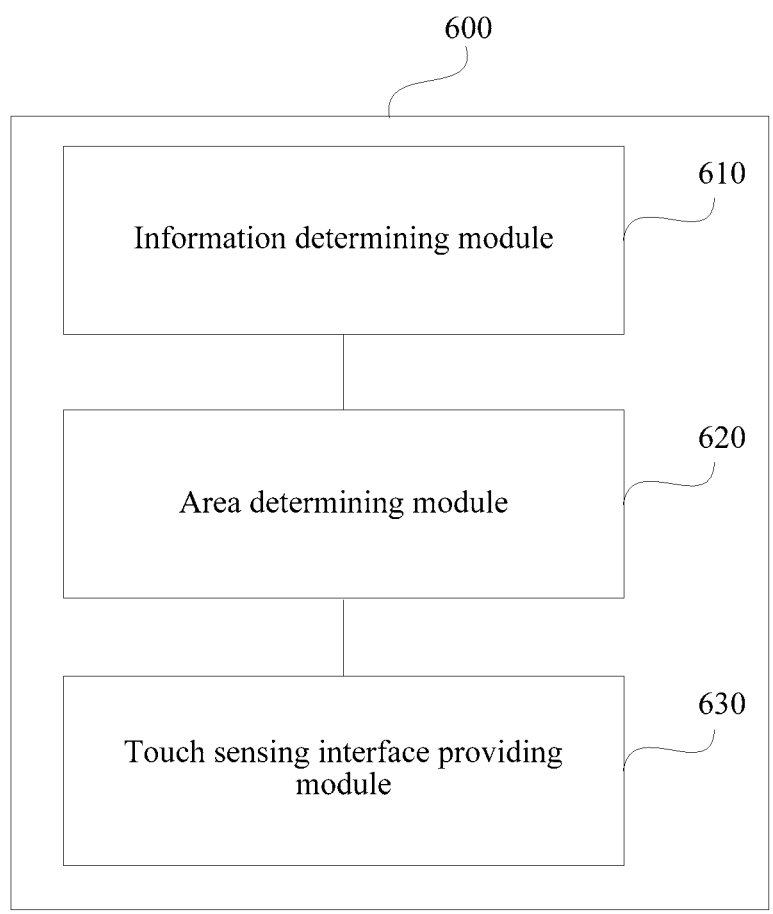
FIG. 6 is a schematic structural block diagram of an interaction apparatus according to an embodiment of the present application.

As shown in FIG. 6, an embodiment of the present application further provides an interaction apparatus 600, comprising:

an information determining module 610, configured to determine shape related information of a deformable touch sensing surface, where the shape related information corresponds to a first shape of the deformable touch sensing surface after a folding deformation;

an area determining module 620, configured to determine multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and a touch sensing interface providing module 630, configured to use the multiple effective interaction areas as an interaction area at least according to a first relative position of the multiple effective interaction areas in the spatial position in the first shape to provide a touch sensing interface to at least one interaction object.

In an implementing manner in this embodiment of the present application, after a deformation of the deformable touch sensing surface occurs, multiple effective interaction areas adjacent in the spatial position are recombined to obtain one new interaction area used to provide a touch sensing interface to an interaction object, thereby bringing new experience to a user by using a deformation property of a deformable device.

The modules and units in this embodiment of the present application are further described by using the following implementing manners.

In a possible implementing manner, optionally, the shape related information may comprise:

the first shape information of the first shape.

In another possible implementing manner, optionally, the shape related information may also be not the first shape information, and instead may indirectly obtain other information of the first shape information. For example, the shape related information comprises:

second shape information of a second shape of the deformable touch sensing surface before the folding deformation, and deformation information corresponding to the folding deformation.

Here, the deformation information may be a shape change parameter, or may be another parameter related to a deformation. For example, when the deformable touch sensing surface is a thermally-induced deformation material, the deformation information may comprise temperature change information and the like of areas. Alternatively, for example, the deformation information may further be displacement information, of areas on the deformable touch sensing surface, acquired by using an acceleration sensing array, a gyroscope array, and the like corresponding to the deformable touch sensing surface.

A person skilled in the art may know that the first shape may also be determined according to the second shape information and the deformation information.

Figure 7A:
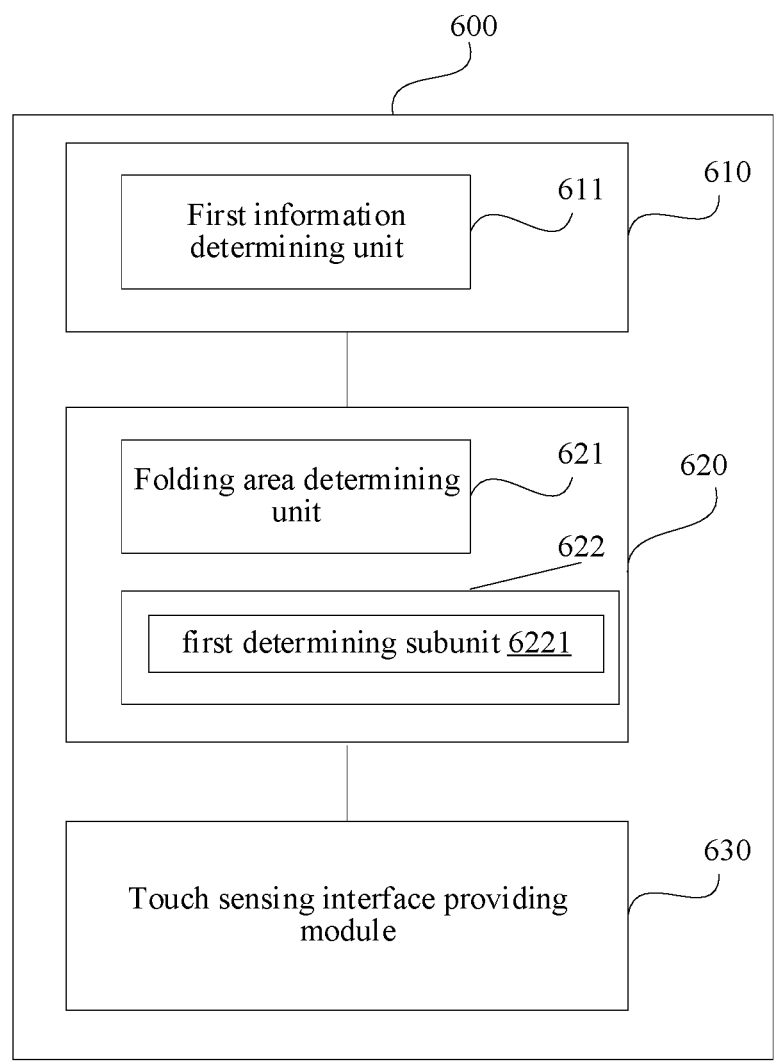
FIG. 7a to FIG. 7f are schematic structural block diagrams of six interaction apparatus according to an embodiment of the present application.

In a possible implementing manner, the deformable touch sensing surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in a possible implementing manner, as shown in FIG. 7a, the information determining module 610 comprises:

a first information determining unit 611, configured to determine the shape related information at least according to a deformation control instruction, where the deformation control instruction is used to control the folding deformation of the deformable touch sensing surface.

In a possible implementing manner, the first information determining unit 611 may, for example, acquire a correspondence between at least one deformation control instruction and at least one piece of deformation related information from a storage module according to the deformation control instruction, where the storage module stores the correspondence, and then obtain deformation related information corresponding to the deformation control instruction.

Figure 7B:
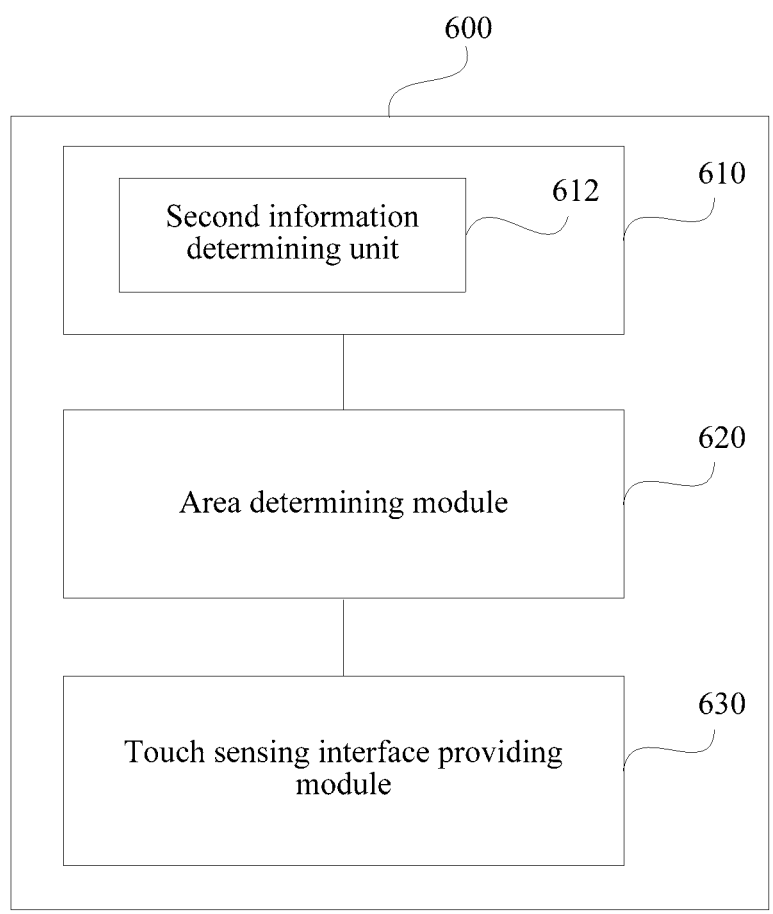

In addition to the foregoing the deformation control instruction, a deformation sensor configured to acquire corresponding deformation sensing information according to a deformation of the deformable touch sensing surface may be further used to obtain the deformation related information. The deformation sensor, for example, may generate a corresponding voltage or current parameter value according to a deformation of the deformable touch sensing surface, where the deformation sensing information is the voltage or current parameter value. Therefore, in a possible implementing manner, as shown in FIG. 7b, the information determining module 610 may comprise:

a second information determining unit 612, configured to determine the shape related information at least according to deformation sensing information for the deformable touch sensing surface.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0.

Alternatively, in another possible implementing manner, that two effective interaction areas are adjacent in a spatial position may be that a distance between nearby edges of the two interaction areas is less than a set value.

In some possible implementing manners, the set value may be determined according to influence of the distance on interaction of the interaction object. For example, when the distance between two adjacent effective interaction areas is too large for a user to perform touch input between the two effective interaction areas (for example, a slide gesture cannot successfully traverse two effective interaction areas), the distance between the two effective interaction areas is greater than the set value.

In a possible implementing manner, as shown in FIG. 7a, the area determining module 620 comprises:

a folding area determining unit 621, configured to determine, according to the shape related information, multiple folding areas where multiple outwardly-bending end surfaces are located, where the multiple outwardly-bending end surfaces are adjacent in the spatial position on the deformable touch sensing surface in the first shape; and an area determining unit 622, configured to determine the multiple effective interaction areas at least according to the multiple folding areas.

In a possible implementing manner, the multiple effective interaction areas are the multiple folding areas. Therefore, in this implementing manner, as shown in FIG. 7a, the area determining unit 622 comprises:

a first determining subunit 6221, configured to determine that the multiple folding areas are the multiple effective interaction areas.

Figure 7C:
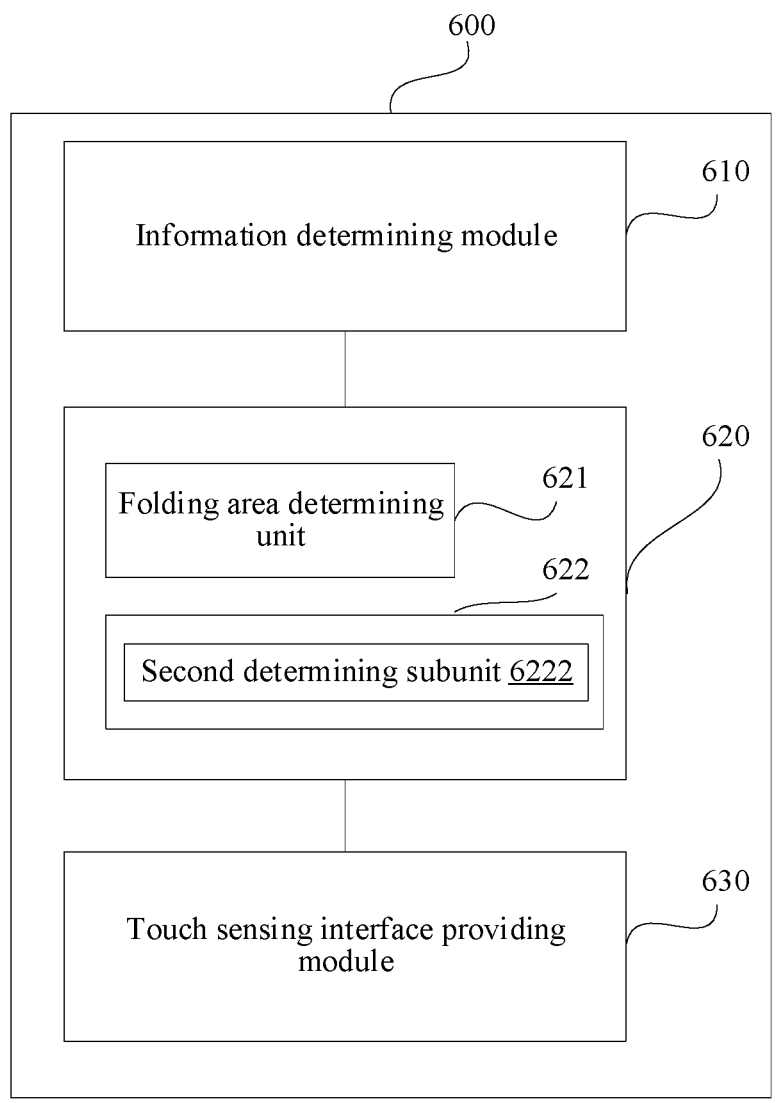

In some possible implementing manners, in addition to the foregoing the multiple folding areas, the multiple effective interaction areas may further comprise another area that is adjacent to or is connected to the multiple folding areas in the spatial position after the folding deformation occurs. Therefore, in this implementing manner, as shown in FIG. 7c, the area determining unit 622 comprises:

a second determining subunit 6222, configured to determine the multiple effective interaction areas at least according to the multiple folding areas and the first shape.

Figure 7D:
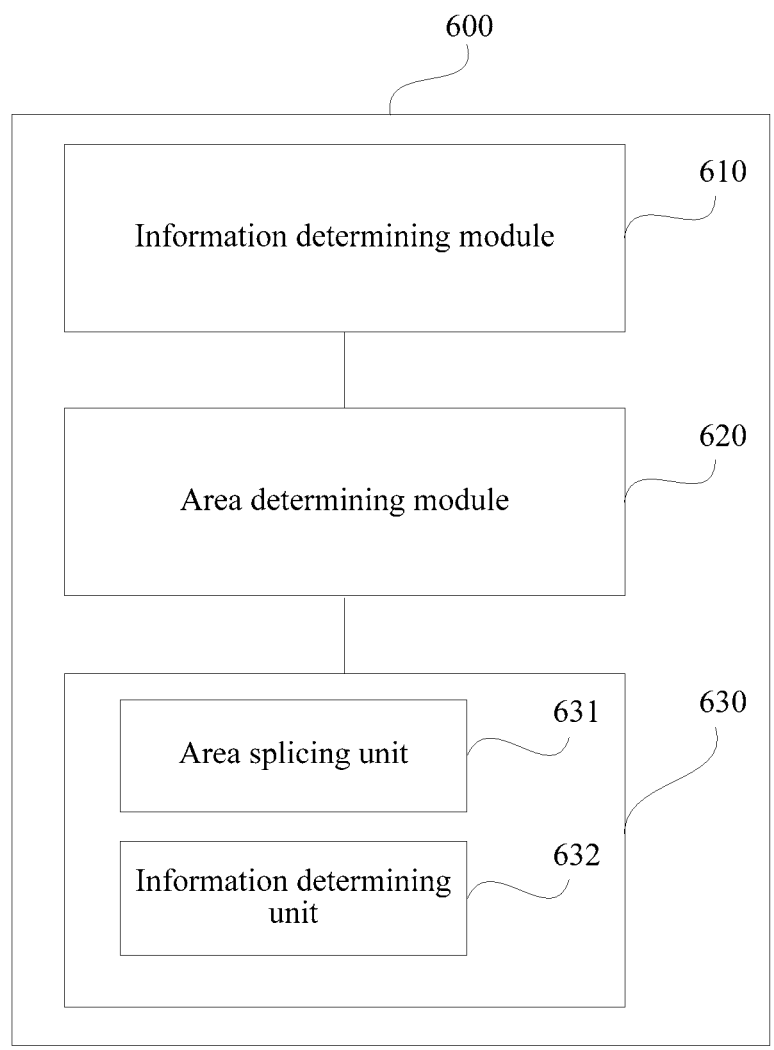

In a possible implementing manner, as shown in FIG. 7d, optionally, the touch sensing interface providing module 630 may comprise:

an area splicing unit 631, configured to perform splicing on the multiple effective interaction areas according to the first relative position to form the interaction area. For a specific splicing manner, reference is made to the corresponding description in the foregoing method embodiments.

In a possible implementing manner, as shown in FIG. 7d, optionally, the touch sensing interface providing module 630 may comprise:

an information determining unit 632, configured to determine touch sensing information corresponding to the interaction area.

In a scenario in which the interaction apparatus comprises the deformable touch sensing surface:

In a possible implementing manner, the information determining unit 632 may be further configured to:

perform touch sensing scanning on the multiple touch sensing units according to a correlation relationship between multiple touch sensing units corresponding to the interaction area (that is, multiple touch sensing units comprised in the multiple effective interaction area), to obtain the touch sensing information.

Figure 7E:
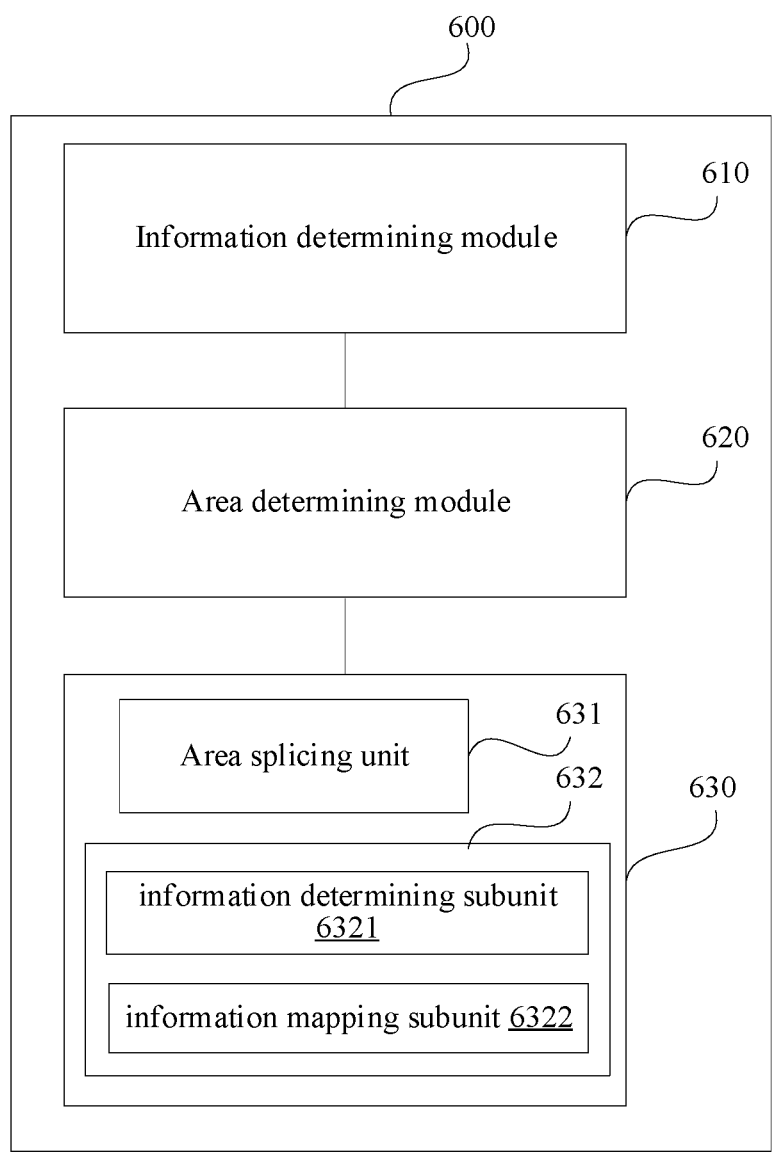

In another possible implementing manner, as shown in FIG. 7e, optionally, the information determining unit 632 comprises:

an information determining subunit 6321, configured to determine multiple pieces of touch sensing sub-information corresponding to the multiple effective interaction areas, for example, perform touch sensing scanning on the multiple effective interaction areas respectively, to obtain the multiple pieces of touch sensing sub-information; and an information mapping subunit 6322, configured to map the touch sensing sub-information from the multiple effective interaction areas to the interaction area according to the first relative position, to obtain the touch sensing information.

In a scenario in which the interaction apparatus does not comprise the deformable touch sensing surface, the information determining unit 632 may further comprise:

a communication subunit, configured to acquire the touch sensing information from at least one external device (for example, an external device that comprises the deformable touch sensing surface) by using a manner of communication.

Figure 7F:
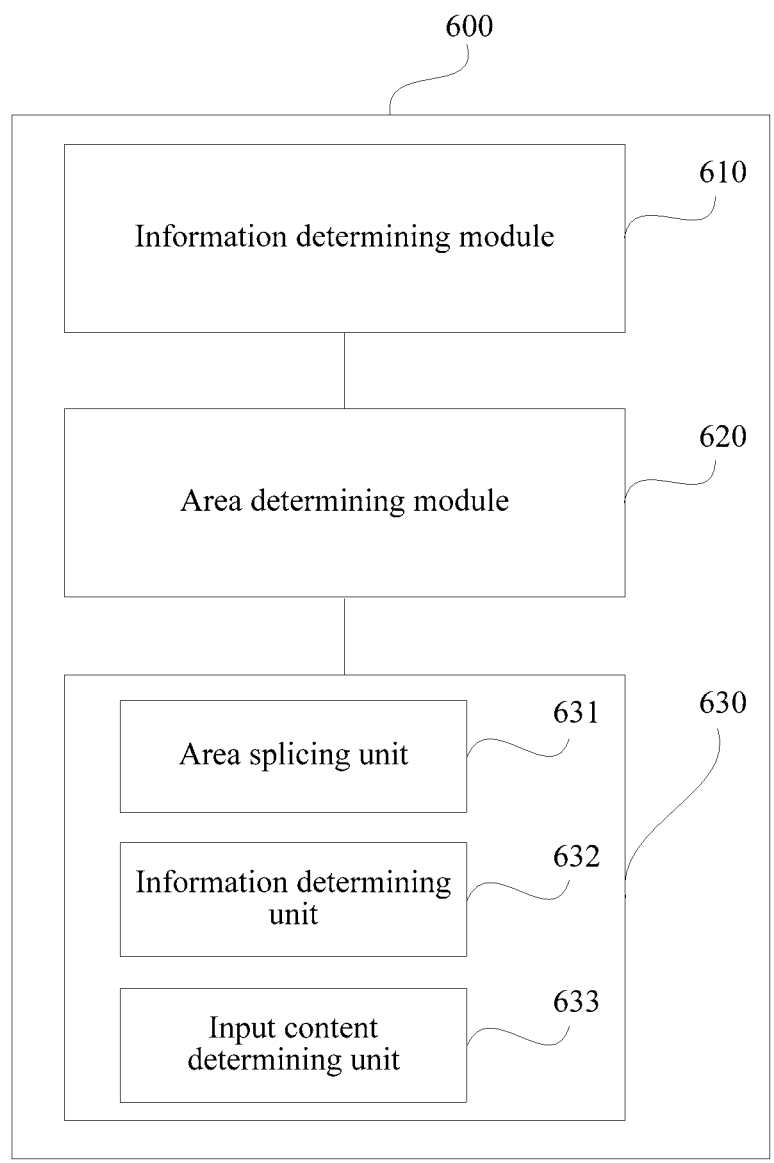

In a possible implementing manner, as shown in FIG. 7f, optionally, the touch sensing interface providing module 630 further comprises:

an input content determining unit 633, configured to determine input content corresponding to the touch sensing information at least according to the touch sensing information.

Here, the input content, for example, may be an input instruction.

By using a beforehand setting, a first correspondence between multiple pieces of touch sensing information and multiple pieces of input content may be determined. In this case, after the touch sensing information is acquired, the input content may be directly obtained according to the first correspondence.

Figure 7G:
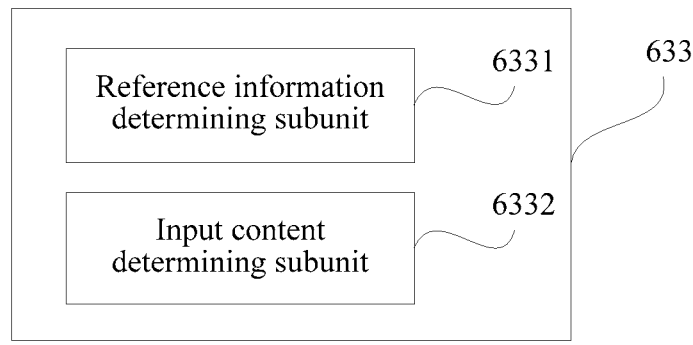
FIG. 7g is a schematic structural block diagram of an input content determining unit of an interaction apparatus according to an embodiment of the present application.

In a possible implementing manner, after the folding deformation of the deformable touch sensing surface occurs, the correspondence between touch sensing information and input content may also be correspondingly adjusted. Under the limit that the size of the interaction area is reduced, a user cannot conveniently implement a gesture corresponding to input content in the interaction area. Therefore, as shown in FIG. 7g, optionally, the input content determining unit 633 comprises:

a reference information determining subunit 6331, configured to: in response to that the touch sensing information comprises distance information, determining reference touch sensing information corresponding to the touch sensing information at least according to a scaling ratio of the interaction area relative to the deformable touch sensing surface, where the reference touch sensing information comprises reference distance information between which and the distance information the scaling ratio is met; and an input content determining subunit 6332, configured to determine the input content according to the reference touch sensing information and a second correspondence between at least one piece of reference touch sensing information and at least one piece of input content.

In this implementing manner, a second correspondence between at least one piece of reference touch sensing information and at least one piece of input content may be a correspondence between at least one piece of touch sensing information and at least one piece of input content corresponding to an unfolded state of the deformable touch sensing surface.

For further description of this implementing manner, reference is made to description corresponding to the embodiment shown in FIG. 4a and FIG. 4b. By using this implementing manner, a problem that an original gesture input cannot or can hardly be accomplished because a size of an interaction area changes can be avoided.

For further description of functions of modules and units in this embodiment of the present application, reference is made to the corresponding description in the foregoing method embodiments.

Figure 8:
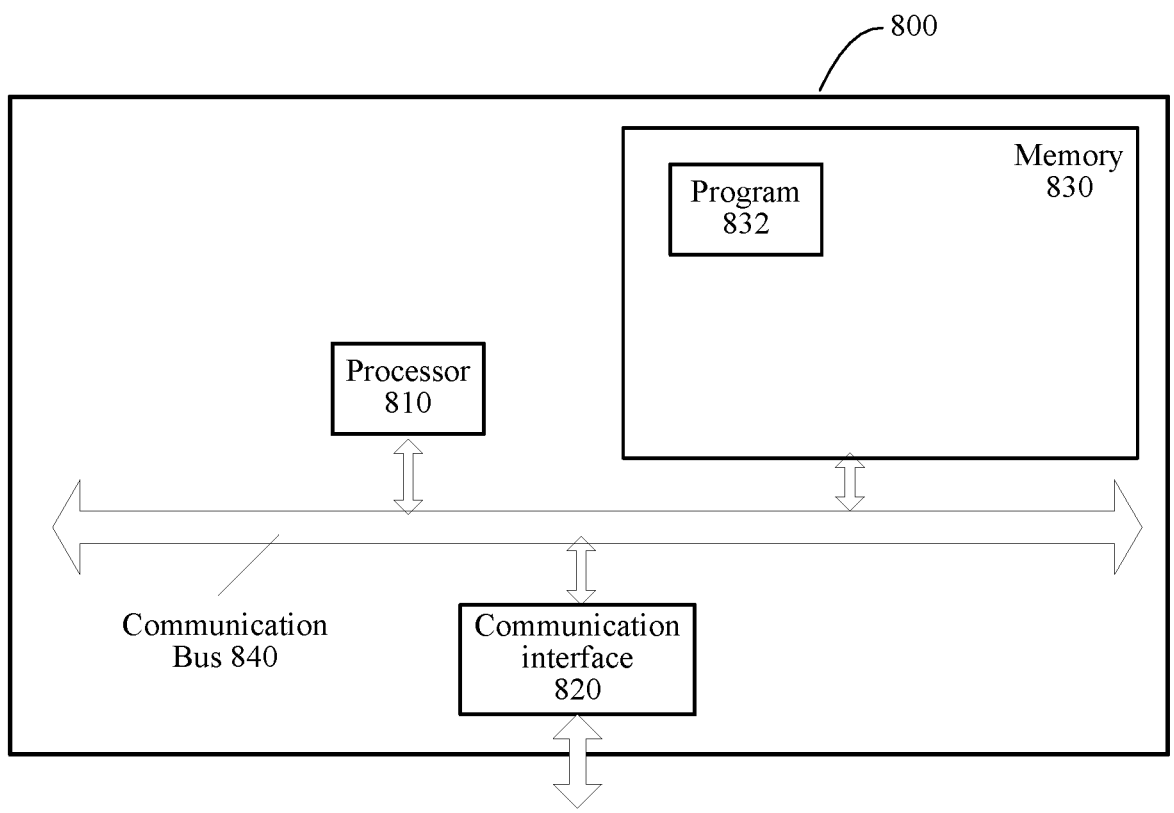
FIG. 8 is a schematic structural block diagram of user equipment according to an embodiment of the present application.

FIG. 8 is a schematic structural diagram of user equipment 800 according to an embodiment of the present application. In a specific embodiment of the present application, a specific implementation of user equipment 800 is not limited. As shown in FIG. 8, the user equipment 800 may comprise:

a processor 810, a communication interface 820, a memory 830, and a communication bus 840.

The processor 810, the communication interface 820, and the memory 830 accomplish communication with each other by using the communication bus 840.

The communication interface 820 is configured to communicate with a network element such as a client.

The processor 810 is configured to execute a program 832, and specifically may execute related steps in the foregoing method embodiment.

Specifically, the program 832 may comprise program code, where the program code comprises a computer operation instruction.

The processor 810 may be a central processing unit (CPU), or an application specific integrated circuit (ASIC), or may be configured as one or more integrated circuits that implement this embodiment of the present application.

The memory 830 is configured to store the program 832. The memory 830 may comprise a high-speed RAM, or may further comprise a non-volatile memory, for example, at least one magnetic disk memory. The program 832 specifically may be configured to cause the user equipment 800 to execute the following operations:

determining shape related information of a deformable touch sensing surface, where the shape related information corresponds to a first shape of the deformable touch sensing surface after a folding deformation;

determining multiple effective interaction areas on the deformable touch sensing surface at least according to the shape related information, where the multiple effective interaction areas meet the following conditions: in nonadjacent positions on the deformable touch sensing surface, and adjacent in a spatial position in the first shape; and using the multiple effective interaction areas as an interaction area at least according to a first relative position of the multiple effective interaction areas in the spatial position in the first shape to provide a touch sensing interface to at least one interaction object.

Reference may be made to corresponding description of corresponding steps and units in the foregoing embodiment for specific implementation of the steps in the program 832, which is no longer elaborated herein. A person skilled in the art may clearly understand that, for convenience and simplicity of description, reference may be made to corresponding process description in the foregoing method embodiment for a specific working process of devices and modules described above, which are no longer elaborated herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random-access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method, comprising: after a folding deformation of a deformable touch sensing surface,
determining shape related information of the deformable touch sensing surface, wherein the shape related information corresponds to a first shape of the deformable touch sensing surface formed after the folding deformation;
determining multiple effective interaction areas on the deformable touch sensing surface after the folding deformation at least according to the shape related information, wherein the multiple effective interaction areas are areas which perform effective interaction with at least one interaction object, and meet the following conditions: being in nonadjacent positions of the deformable touch sensing surface and located on a same plane before the folding deformation, and being adjacent in a spatial position in the first shape of the deformable touch sensing surface formed after the folding deformation to form one new larger effective interaction area; and
using the new larger effective interaction area at least according to a first relative position of the multiple effective interaction areas in the spatial position in the first shape to provide a touch sensing interface to the at least one interaction object,
wherein the determining multiple effective interaction areas at least according to the shape related information comprises:
determining, according to the shape related information, multiple folding areas where multiple bent-shaped outwardly-bending end surfaces are located, where the multiple bent-shaped outwardly-bending end surfaces are adjacent in the spatial position on the deformable touch sensing surface in the first shape; and
determining that the multiple effective interaction areas are the multiple bent-shaped outwardly-bending end surfaces.

2. The method of claim 1, wherein the shape related information comprises:
first shape information of the first shape.

3. The method of claim 1, wherein the shape related information comprises:
second shape information of a second shape of the deformable touch sensing surface before the folding deformation, and deformation information corresponding to the folding deformation.

4. The method of claim 1, wherein
the shape related information is determined at least according to a deformation control instruction,
where the deformation control instruction is used to control the folding deformation of the deformable touch sensing surface.

5. The method of claim 1, wherein
the shape related information is determined at least according to deformation sensing information for the deformable touch sensing surface.

6. The method of claim 1, wherein the determining multiple effective interaction areas at least according to the shape related information comprises:
determining the multiple effective interaction areas at least according to the first shape.

7. The method of claim 1, wherein
for a first effective interaction area of the multiple effective interaction areas, at least another effective interaction area that is adjacent in the spatial position to the first effective interaction area exists,
where the first effective interaction area is any effective interaction area of the multiple effective interaction areas.

8. The method of claim 1, wherein the using the new larger effective interaction area at least according to a first relative position to provide a touch sensing interface to the at least one interaction object comprises:
performing splicing on the multiple effective interaction areas according to the first relative position to form the interaction area.

9. The method of claim 1, wherein the using the new larger effective interaction area at least according to a first relative position to provide a touch sensing interface to the at least one interaction object comprises:
determining touch sensing information corresponding to the interaction area.

10. The method of claim 9, wherein the determining touch sensing information comprises:
determining multiple pieces of touch sensing sub-information corresponding to the multiple effective interaction areas; and
mapping the multiple pieces of touch sensing sub-information from the multiple effective interaction areas to the interaction area according to the first relative position, to obtain the touch sensing information.

11. The method of claim 9, wherein the using the new larger effective interaction area at least according to a first relative position to provide a touch sensing interface to the at least one interaction object further comprises:
determining input content corresponding to the touch sensing information at least according to the touch sensing information.

12. The method of claim 11, wherein the determining input content at least according to the touch sensing information comprises:
in response to that the touch sensing information comprises distance information, determining reference touch sensing information corresponding to the touch sensing information at least according to a scaling ratio of the interaction area relative to the deformable touch sensing surface, where the reference touch sensing information comprises reference distance information between which and the distance information the scaling ratio is met; and
determining the input content according to the reference touch sensing information and a correspondence between at least one piece of the reference touch sensing information and at least one piece of the input content.

13. A non-transitory computer-readable storage medium configured with instructions executable by one or more processors to cause the one or more processors to perform operations comprising:
after a folding deformation of a deformable touch sensing surface,
determining shape related information of the deformable touch sensing surface, wherein the shape related information corresponds to a first shape of the deformable touch sensing surface formed after the folding deformation;
determining multiple effective interaction areas on the deformable touch sensing surface after the folding deformation at least according to the shape related information, wherein the multiple effective interaction areas are areas which perform effective interaction with at least one interaction object, and meet the following conditions: being in nonadjacent positions of the deformable touch sensing surface and located on a same plane before the folding deformation, and being adjacent in a spatial position in the first shape of the deformable touch sensing surface formed after the folding deformation to form one new larger effective interaction area; and
using the new larger effective interaction area at least according to a first relative position of the multiple effective interaction areas in the spatial position in the first shape to provide a touch sensing interface to the at least one interaction object,
wherein the determining multiple effective interaction areas at least according to the shape related information comprises:
determining, according to the shape related information, multiple folding areas where multiple bent-shaped outwardly-bending end surfaces are located, where the multiple bent-shaped outwardly-bending end surfaces are adjacent in the spatial position on the deformable touch sensing surface in the first shape; and
determining that the multiple effective interaction areas are the multiple bent-shaped outwardly-bending end surfaces.

14. An apparatus, comprising:
a memory, configured to store computer-executable instructions; and
a processor, configured to execute the instructions stored in the memory, wherein the instructions cause the processor to execute operations including: after a folding deformation of a deformable touch sensing surface,
determining shape related information of the deformable touch sensing surface, wherein the shape related information corresponds to a first shape of the deformable touch sensing surface formed after the folding deformation;
determining multiple effective interaction areas on the deformable touch sensing surface after the folding deformation at least according to the shape related information, wherein the multiple effective interaction areas are areas which perform effective interaction with at least one interaction object, and meet the following conditions: being in nonadjacent positions of the deformable touch sensing surface and located on a same plane before the folding deformation, and being adjacent in a spatial position in the first shape of the deformable touch sensing surface formed after the folding deformation to form one new larger effective interaction area; and
using the new larger effective interaction area at least according to a first relative position of the multiple effective interaction areas in the spatial position in the first shape to provide a touch sensing interface to the at least one interaction object,
wherein the determining multiple effective interaction areas at least according to the shape related information comprises:
determining, according to the shape related information, multiple folding areas where multiple bent-shaped outwardly-bending end surfaces are located, where the multiple bent-shaped outwardly-bending end surfaces are adjacent in the spatial position on the deformable touch sensing surface in the first shape; and determining that the multiple effective interaction areas are the multiple bent-shaped outwardly-bending end surfaces.

15. The apparatus of claim 14, wherein the shape related information comprises:
    first shape information of the first shape.

16. The apparatus of claim 14, wherein the shape related information comprises:
    second shape information of a second shape of the deformable touch sensing surface before the folding deformation, and deformation information corresponding to the folding deformation.

17. The apparatus of claim 14, wherein the operations further comprise:
    determining the shape related information at least according to a deformation control instruction,
    where the deformation control instruction is used to control the folding deformation of the deformable touch sensing surface.

18. The apparatus of claim 14, wherein the operations further comprise:
    determining the shape related information at least according to deformation sensing information for the deformable touch sensing surface.

19. The apparatus of claim 14, wherein the operations further comprise:
    determining the multiple effective interaction areas at least according to the first shape.

20. The apparatus of claim 14, wherein
    for a first effective interaction area of the multiple effective interaction areas, at least another effective interaction area that is adjacent in the spatial position to the first effective interaction area exists,
    where the first effective interaction area is any effective interaction area of the multiple effective interaction areas.

21. The apparatus of claim 14, wherein the operations further comprise:
    splicing on the multiple effective interaction areas according to the first relative position to form the interaction area.

22. The apparatus of claim 14, wherein the operations further comprise:
    determining touch sensing information corresponding to the interaction area.

23. The apparatus of claim 22, wherein the operations further comprise:
    determining multiple pieces of touch sensing sub-information corresponding to the multiple effective interaction areas; and
    mapping the multiple pieces of touch sensing sub-information from the multiple effective interaction areas to the interaction area according to the first relative position, to obtain the touch sensing information.

24. The apparatus of claim 22, wherein the operations further comprise:
    determining input content corresponding to the touch sensing information at least according to the touch sensing information.

25. The apparatus of claim 24, wherein the operations further comprise:
    in response to that the touch sensing information comprises distance information, determining reference touch sensing information corresponding to the touch sensing information at least according to a scaling ratio of the interaction area relative to the deformable touch sensing surface, where the reference touch sensing information comprises reference distance information between which and the distance information the scaling ratio is met; and
    determining the input content according to the reference touch sensing information and a correspondence between at least one piece of the reference touch sensing information and at least one piece of the input content.

* * * * *